(12) United States Patent
Griffioen et al.

(10) Patent No.: US 6,711,328 B2
(45) Date of Patent: Mar. 23, 2004

(54) INSTALLATION BUNDLE WITH SPACER

(75) Inventors: Willem Griffioen, Ter Aar (NL); Arie Van Wingerden, Hendrik Ido Ambacht (NL); Cornelis Van 'T Hul, Den Hoorn (NL); Pieter Lock, 's-Gravenhage (NL); Willem Greven, Delfzijl (NL); Frans Robbert Bakker, Wagenborgen (NL)

(73) Assignee: NKF Kabel B.V., Gouda (NL)

( * ) Notice: Subject to any disclaimer, the term of this patent is extended or adjusted under 35 U.S.C. 154(b) by 0 days.

(21) Appl. No.: 09/904,941

(22) Filed: Jul. 12, 2001

(65) Prior Publication Data

US 2003/0012527 A1 Jan. 16, 2003

(51) Int. Cl.⁷ .................................................. G02B 6/44
(52) U.S. Cl. ........................ 385/100; 385/112; 385/109
(58) Field of Search ................................. 385/100, 135, 385/137, 136, 114, 53, 76, 77, 123, 109–112

(56) References Cited

U.S. PATENT DOCUMENTS

| | | | |
|---|---|---|---|
| 4,691,896 A | 9/1987 | Reeve et al. | 254/134.4 |
| 4,741,684 A | * 5/1988 | Cornelison et al. | 425/114 |
| 4,784,461 A | * 11/1988 | Abe et al. | 385/112 |
| 4,804,020 A | * 2/1989 | Bartholomew | 138/111 |
| 4,850,569 A | 7/1989 | Griffioen et al. | 254/134.4 |
| 4,934,662 A | 6/1990 | Griffioen et al. | 254/134.4 |
| 5,087,110 A | * 2/1992 | Inagaki et al. | 385/110 |
| 5,197,715 A | 3/1993 | Griffioen | 254/134.4 |
| 5,211,377 A | 5/1993 | Griffioen et al. | 254/134.4 |
| 5,308,041 A | 5/1994 | Griffioen et al. | 254/134.4 |
| 5,474,277 A | 12/1995 | Griffioen | 254/134.4 |
| 5,639,183 A | 6/1997 | Griffioen et al. | 405/154 |
| 5,645,267 A | 7/1997 | Reeve et al. | 254/134.4 |
| 5,761,361 A | * 6/1998 | Pfandl et al. | 385/100 |
| 5,884,384 A | 3/1999 | Griffioen | 29/468 |
| 5,897,103 A | 4/1999 | Griffioen et al. | 254/134.4 |
| 5,902,958 A | * 5/1999 | Haxton | 174/47 |
| 6,047,954 A | 4/2000 | Griffioen | 254/134.4 |
| 6,129,341 A | 10/2000 | Griffioen et al. | 254/134.4 |

FOREIGN PATENT DOCUMENTS

WO     WO 02/18997    * 3/2002 ................. 385/100

* cited by examiner

*Primary Examiner*—Jean F. Duverne
(74) *Attorney, Agent, or Firm*—Dennis T. Griggs (57) ABSTRACT

A filling body is inserted together with a loose bundle of guide tubes during installation in an existing protective duct, thus enlarging the bundle diameter (which reduces the buckling risk) and making crossing of the guide tubes impossible. The guide tubes are positioned along the outside of the filling body, providing access to the guide tubes during post-installation branching. The filling body may include radially projecting spacer ribs that separate the guide tubes, thereby preventing crossing movement and helical stranding. The guide tubes are thus constrained and carried along with the filling body in alignment with the spacer ribs, so that buckling, helical stranding and three-dimensional restrictions or tangles cannot occur. The filling body may include a thin tubular sidewall enclosing a longitudinal airflow passage that may be pressurized during installation, and deformable when unpressurized, thus providing mechanical protection against damage of the protective duct after installation.

29 Claims, 4 Drawing Sheets

INSTALLATION BUNDLE WITH SPACER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates generally to optical telecommunications networks, and in particular to methods and apparatus for installing guide tubes through which fiber optic cables are to be routed within a protective conduit such as an underground duct. Specifically, this invention provides an improved bundle of guide tubes containing a filling body or spacer that facilitates installation through the bends and undulations of a duct trajectory while providing mechanical protection against excessive forces that may be applied to the guide tubes after installation.

Various factors should be considered when a fiber optic cable is installed in a protective duct. A major concern is avoidance of damage to the cable during installation. Another concern is ease of installation and the desire for a reduction in the amount of time needed to install the cable. Generally, it is desirable to install the longest continuous length of cable possible to reduce the number of splices needed for the cable run.

Protective cable ducts have been channelized in an effort to satisfy these concerns. For this purpose two or more guide tubes, whose interiors may have a lower coefficient of friction than the protective duct, are installed in the existing protective duct, thereby establishing separate channels or sub-ducts in which one or more cables, optionally at a later time, can be blown or flowed through the protective duct over a greater length. It may also be desirable to install in an existing protective duct a larger number of guide tubes with a smaller cross section than that of the existing protective duct if it is desired to use each of the smaller tubes as a separate channel or subduct for single-core or multi-core copper or glass fiber cables. Further, it may be necessary to install in an existing duct a protective guide tube with a water barrier, so that in the existing duct, whose interior gradually fills up with water through diffusion, a waterproof conduit is created by means of the protective guide tube, this waterproof conduit allowing the routing of cables without a water shield.

An early approach to duct channelization is described in EP-A-0108590 to Reeve in which a ducting network, the ducts of which have previously been provided with a number of separate channels, allows a separate lightweight and flexible fiber optic member to be blown in by compressed air in each channel without armor or water barrier. The duct provided with channels protects the cables against external influences, such as moisture and the like. In this way, a network with individual fiber optic members to each customer is created, with the fiber optic members being arranged in parallel channels up to the branches.

U.S. Pat. No. 5,884,384 to Griffioen describes combining high-speed airflow with a pushing force to install channelization guide tubes in an existing protective duct. In the air blowing/pushing technique the air-drag propelling forces on the bundle are distributed over the entire length of the guide tubes. The longitudinal forces imposed on the guide tubes are kept low and because of that friction arising along curves of the duct trajectory is minimized.

During blowing/pushing installation of guide tubes, the propelling air-drag force developed by the volumetric flow of air through the protective duct is proportional to the compressor output pressure and bundle diameter. However, the frictional load imposed by rubbing engagement of the guide tubes against the duct is proportional to the bundle weight, hence to the square of the bundle diameter. Moreover, a bundle that fills the duct for a large part, when the bundle is tight, is subjected to extra friction caused by bends and undulations in the duct trajectory due to the stiffness of the bundle, which increases with the fourth power of the bundle diameter. On the other hand a bundle that just fits in the protective duct can be pushed harder without buckling, but the frictional loading caused by rubbing engagement imposes a limit on the continuous installation length that can be obtained by pushing/blowing for such large bundle diameters.

For making the most productive use of available underground duct space, it has been conventional practice during the initial installation to fill the protective duct as completely as possible with channelization guide tubes of various diameters to accommodate present and anticipated cable branching/drop requirements. In previous guide tube installations, the size and number of guide tubes have been selected to provide a high filling of the protective duct. However, it was found in practice that such jobs incur increased installation time, along with a reduction of the overall bundle length that can be blown in continuously, thus requiring more guide tube joints, more duct junctions and, last but not least, a shorter maximal distance between handholes or manholes (if installation is done in an existing duct trajectory, where digging the street again is to be avoided).

For a loose bundle of guide tubes an intermediate filling degree is desirable to allow the guide tubes to move away when the duct is indented, thus providing some mechanical protection. It has been demonstrated that guide tube bundles with a cross-sectional area of approximately half the inner cross-sectional area of the protective duct are protected just as good as armored cables.

It can be understood that a bundle with a larger diameter is more difficult to blow in. The friction forces that oppose installation are proportional to bundle weight, hence to the square of bundle diameter. The air-drag that assists installation is proportional to bundle diameter. But, for a loose bundle that fills the protective duct for a large part the negative effect of extra friction in bends and undulations of the duct trajectory due to the bundle stiffness is, surprisingly enough, not as severe as for a tight bundle, where the tubes cannot slide freely and where the stiffness of the bundle increases with the fourth power of bundle diameter. In order to maintain a small stiffness of the loose bundle it is required that the guide tubes can slide over each other without too much friction. Still the positive effect, that a bundle that just fits in the duct can be pushed harder without buckling, exists.

That installation of a loose bundle of tubes is more troublesome than expected was made evident during a test installation in which a loose bundle of ten guide tubes (7/5.5 mm) were blown into a 40/33 mm protective duct. This provided a filling factor of about 50% of the duct cross-sectional area. This bundle was more difficult to blow in (1200 m reached) than a bundle of seven guide tubes (1500 m reached without problems). When the same installations were repeated in a duct trajectory with many bends the difference in performance became even larger. The performance of installation of bundles with higher filling factor drops even more rapidly. These drops in installation length were not predicted by theory (computer simulation).

Figure 1:
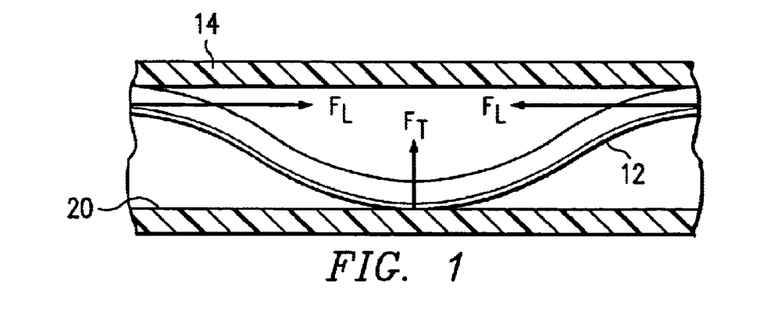
FIG. 1 is a schematic side elevation view, partly in section, showing crossing and buckling of a single guide tube during installation in a protective duct.
Figure 2:
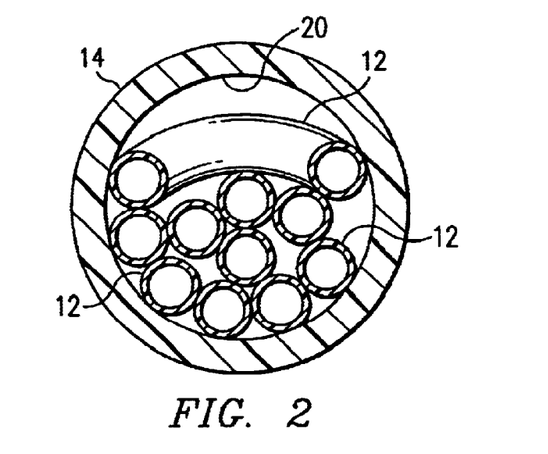
FIG. 2 is a sectional view of a protective duct in which a loose bundle of guide tubes is installed, with crossing of the guide tubes causing a three-dimensional restriction.

When the filling degree of the bundle is low (for example 50% as shown in FIG. 2) there is space enough for crossing of guide tubes to occur. When installation is done by pushing, the guide tubes may buckle and cause extra friction, see FIG. 1. Here a longitudinal pushing force $F_L$ results in a transversal force $F_T$ between the guide tube 12 and the protective duct 14. When the pushing forces are taken away the friction caused by the buckling will disappear again. The guide tube 12 when forming a 3-dimensional restriction appears as two tubes (indicating the end positions in the S-shape) and a bend loop in between them (indicating the S-shape between the end positions), and rubs in contact with the inner duct sidewall 20 on both sides because that is what happens when the permanent restriction is generating friction.

As the bundle more completely fills the duct more crossing may cause the guide tubes to be pressed against the duct sidewall. Also, a three-dimensional restriction in the form of a permanent "knot" or tangle may be formed. Because the propelling forces are low during pushing/blowing installation, these knots can have an adverse effect on installation performance. Also, buckling can cause permanent friction now, as a result of the three-dimensional restriction in the duct space 20, see FIG. 2. A guide tube can bend in the plane perpendicular to the buckling plane and form a permanent "spring" that remains when the pushing forces are taken away.

SUMMARY OF THE INVENTION

The invention is based on the insight that the guide tubes of a loose bundle may cross or buckle during installation, especially when the bundle is hindered for example in sharp bends of the duct trajectory or as the result of improper mechanical coupling of duct sections. When the cause of crossing and hindering the bundle is taken away the buckles disappear, at least partly, and the friction caused by the buckling will disappear completely.

Hindering of the bundle during installation is overcome according to one aspect of the present invention by a filling body that is inserted together with the guide tubes during installation, thus enlarging the bundle diameter and making crossing of the guide tubes impossible. At the same time the guide tubes are positioned along the outside of the filling body, thus making it possible to access the guide tubes during post-installation branching.

According to another aspect of the invention, the filling body includes an elongated partition member that divides the duct space and separates the guide tubes, thereby preventing helical (S/Z) stranding as well as crossing movement of the guide tubes. According to one aspect of the invention, partitioning of the duct space is provided by a filling body that includes an elongated spacer member and ribs projecting from the elongated spacer member. The guide tubes are thus constrained against crossing movement as they are carried along with the spacer member in alignment with the ribs during installation, so that crossing, buckling, helical stranding and three-dimensional restrictions cannot occur. Also, the loose bundle of guide tubes when constrained by the ribs and filling body can slide along the bore of the protective duct without much friction.

According to yet another aspect of the invention, the filling body includes a tubular sidewall enclosing a longitudinal airflow passage that may be pressurized during installation. The tubular sidewall enlarges the bundle diameter and increases bundle stiffness. Preferably, the tubular sidewall is deformable in response to radial crushing forces, thus providing some mechanical protection against excessive forces that may be applied after installation, when the pressure is taken away. Also, the airflow passage of the tubular sidewall can be used to feed blowing machines in tandem cable installation jobs. To enhance functionality of the deformable filling body to resist pressure (and to maintain its size) it can be useful to reinforce the filling body with roving, preferably cross stranded, so that also torsional reinforcement is obtained.

The method of the invention is further understood by comparing conventional tight bundle installation with the installation method of the present invention in which a loose bundle is run in with a filling body that enlarges the loose bundle diameter. When the diameter of a tight bundle is too large, installation becomes impossible because the stiffness of the tight bundle generates too much friction when passing through bends and undulations in the trajectory. For a loose bundle, the stiffness is much less because the guide tubes can slide freely relative to each other. Pushing of a big bundle still benefits from reduced buckling risk because of the confined geometry. Field-testing has demonstrated that it is surprisingly easy to install loose bundles with a high filling factor because, unlike tight bundles, the positive effect of better pushing behavior is not compromised by the negative effect of too much friction in bends and undulations of the duct trajectory.

Even though mass and hence friction increase with the square of the bundle diameter, loose bundles can still be installed fairly well when the filling factor of the loose bundle is high. On the other hand, for bundles exceeding about 50% filling factor of cross-section area, crossing of guide tubes can result in permanent tangles or knots and high friction forces will hinder installation significantly. The method of the present invention is based on the insight that the filling factor of a loose bundle can be increased to such an extent (above 50% of duct cross section area) that crossing of the guide tubes is not possible anymore. And torsional (SZ) twisting of the guide tubes in the loose bundle is also minimized by the presence of the filling body.

According to another aspect of the invention, the filling body can be pressurized to maintain its size and shape and avoid collapsing by implosion during installation of the loose bundle of guide tubes (when the protective duct is pressurized), and the pressure can be relieved after installation. When the filling body is deformable or collapsible, the effective filling factor during installation should be maintained by internal pressurization of the filling body. Mechanical protection of the protective guide tubes is guaranteed during post-installation service by removing the internal pressure, thus allowing the filling body to collapse and permitting the guide tubes to move away and avoid pinching or crushing forces that might damage or interfere with fiber optic cables installed therein.

BRIEF DESCRIPTION OF THE DRAWING

The invention will be further explained on the basis of certain exemplary embodiments with reference to the drawing figures, in which.

DETAILED DESCRIPTION OF THE PREFERRED EMBODIMENTS

The invention will now be described on the basis of examples where guide tubes and filling bodies are installed in existing protective conduits or ducts, typically laid in an underground trajectory, in which the guide tubes are, intended to function as dedicated cable sub-ducts.

Figure 3:
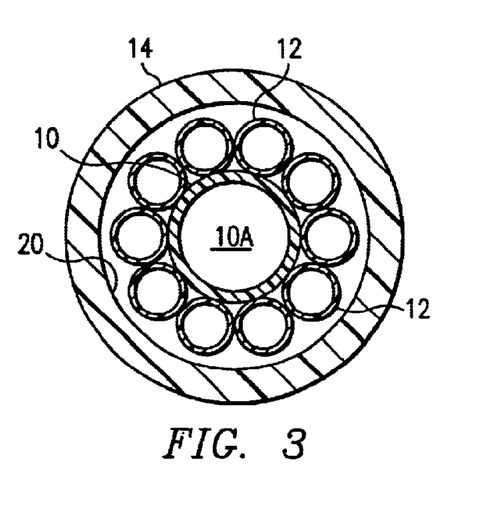
FIG. 3 is a view similar to FIG. 2 in which a filling body is inserted along with the guide tubes, thus enlarging the bundle and making crossing of the guide tubes impossible.

With the insight of the invention as discussed above, it can be demonstrated that surprisingly, enlargement of a guide tube bundle with a certain filling degree of, for example, 50% or more with a filling body, may ease the installation and simultaneously make crossing of the guide tubes impossible. According to a first embodiment of the invention, a filling body 10, as shown in FIG. 3, is inserted together with a loose bundle of guide tubes 12 during installation in a protective duct 14, thus enlarging the overall bundle diameter.

The filling body 10 reduces buckling risk and advantageously prevents crossing of the guide tubes 12 within the duct bore 20. At the same time, the guide tubes 12 are positioned along the outside periphery of the filling body, thus making the guide tubes available for quick access during post-installation branching. However, in the arrangement shown in FIG. 3, some buckling of the guide tubes in a helical stranding (S/Z) pattern about the periphery of the filling body is still possible, especially when pushing forces are high.

Figure 4:
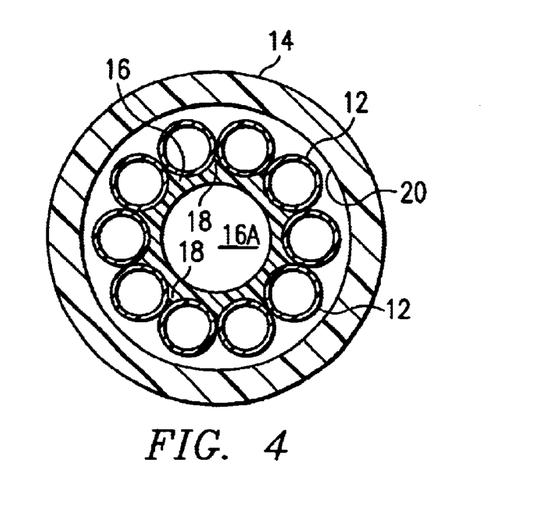
FIG. 4 is a view similar to FIG. 3 in which the filling body includes longitudinal ribs for separating the guide tubes and preventing crossing movement.

Referring now to FIG. 4, an alternative embodiment of the filling body 16 is illustrated. In this embodiment, the filling body 16 includes multiple longitudinal spacer ribs 18 that project radially from the filling body and are angularly spaced with respect to each other, thereby defining a plurality of longitudinally extending pockets in which the guide tubes 12 are received. Crossing of the tubes from one side to the other is made impossible by the ribs. Moreover, installation performance of the cables into the guide tubes is improved because of the straight lines presented by the ribs and guide tubes that are aligned generally in parallel with each other as they are installed through the bore 20 of the duct 14. The longitudinally extending ribs 18 lock the guide tubes against to-and-fro movement, thus preventing helical (S/Z) stranding.

Figure 7:
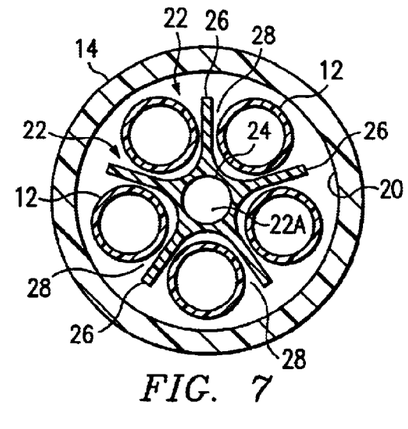
FIG. 7 is a sectional view taken along the line 7—7 of FIG. 6 showing the loose bundle of guide tubes separated and constrained against crossing movement by the filling body.

Referring now to FIG. 7, a filling body 22 according to yet another alternative embodiment is illustrated. In this arrangement, the filling body is constructed with a thin, tubular sidewall 24 from which multiple spacer ribs 26 project radially. The spacer ribs 26 are angularly spaced with respect to each other, thereby defining longitudinal pockets 28 in which the guide tubes 12 are received. According to this arrangement, helical stranding and three-dimensional restrictions cannot occur. Also, the guide tubes when so constrained by the ribs 26 can slide along the bore 20 of the protective duct 14 without incurring much friction.

Figure 8:
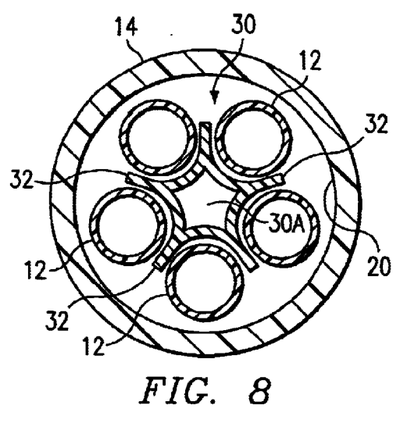
FIG. 8 is a view similar to FIG. 7 showing a loose bundle of guide tubes and filling body with ribs locking the guide tubes against crossing and helical stranding, but with more free space.

A filling body 30 according to an alternative spacer rib profile arrangement is shown in FIG. 8. In this embodiment, the airflow passage 30A is about 9 mm, but the shape is pentagonal. The ribs 32 are shorter than the diameter of the guide tubes, which are of equal size, 10 mm diameter.

Tests have demonstrated that the guide tubes when installed with the filling body profiles as shown in FIGS. 7 and 8 will exhibit less buckling and helical stranding. This can be important for certain installations that are subject to large temperature fluctuations, as might be the case in above-ground installations, for example at bridges. Due to different thermal contraction of the guide tubes 12 relative to the duct 14 in which they are installed, buckling of the guide tubes might occur. The filling body profiles shown in FIGS. 7 and 8 will minimize this risk.

The filling body profiles shown in FIGS. 7 and 8 also divide the space inside the protective duct more equally between the guide tubes than without using a filling body. This means that large voids in the protective duct 14 will disappear. This can be important at flooded sections of the duct trajectory where water freezes. Large quantities of water can accumulate in large voids, thus forming large quantities of ice. The expansion of the body of ice within the duct 14 often destroys the guide tubes 12 and the cables inside them. It has been determined experimentally that freezing is less destructive when the guide tubes 12 are more uniformly distributed within the protective duct. Moreover, the filling body (non-expanding when freezing) displaces some of the water, thus reducing the volume of expanding ice.

Figure 5:
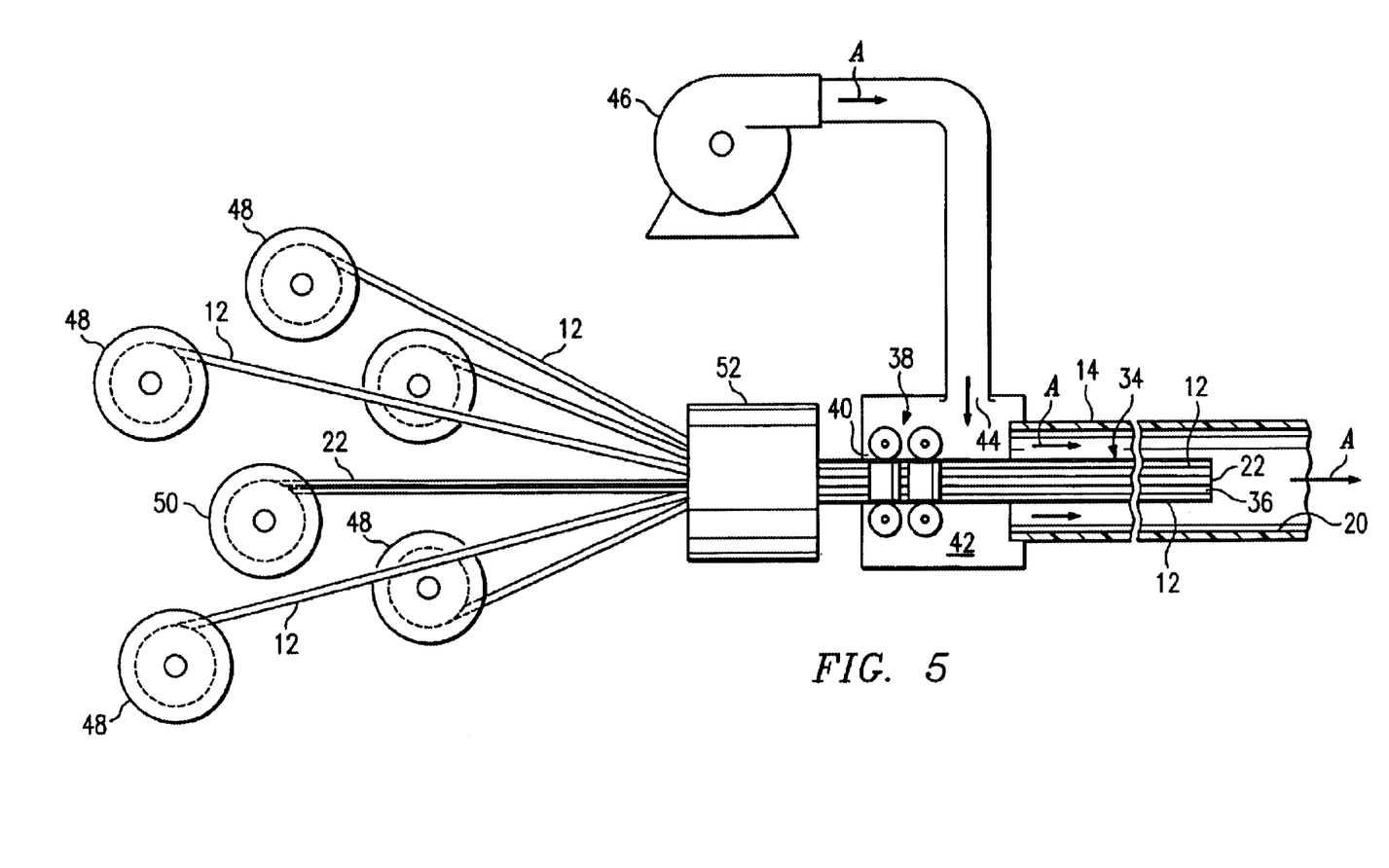
FIG. 5 is a schematic side elevation view, partly broken away, showing installation of a loose bundle of guide tubes along with a filling body according to the pushing and blowing method of the present invention.
Figure 6:
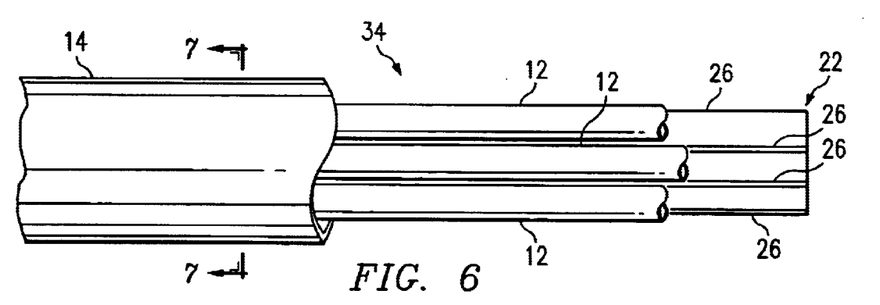
FIG. 6 is a side elevation view, partly broken away, showing the protective duct of FIG. 5 that has been channelized with guide tubes and a filling body.

FIG. 5 shows an existing protective duct 14, in which it is desired to install a loose bundle 34 of guide tubes 12, that are intended to channelize the protective duct, with each guide tube 12 functioning as a separate cable subduct. The ends of the guide tubes 12 are closed by an end cap 36 or a check valve, at the forward, feed-in end thereof. A set of pressure rollers 38 driven by a motor (not shown) pull the guide tube bundle 34 along with the filling body 22 through a feed-in opening 40 of a pressurization chamber 42.

Alternatively, a set of caterpillar tractors may be used to pull the guide tubes into the pressure chamber and push the bundle 34 through the protective duct. The pressure chamber also includes an inlet opening 44 for admitting a fluid under pressure, for instance compressed air A. The pressure rollers 38 or caterpillar tractors may also be placed outside, immediately in front of, the pressurization chamber 42. Connected in airflow communication with the inlet opening 44 is a compressor 46. The trailing end of each guide tube that is yet to be laid is unwound from a reel 48. The filling body 22 is also unwound from a reel 50, or may be pulled from a previously laid tandem duct installation.

It should be understood that the preferred embodiment of the invention is a loose bundle of guide tubes with loose uncoupled feed-in end portions, as shown in FIG. 5. A seal, e.g. a check valve for internal pressurization or an end cap 36, preferably closes the feed-in end portions. Other suitable embodiments include a shuttle, preferably semi-open, coupled to each feed-in end, an elongated probe attached to the feed-in end portions with tapering angle in relation with diameter and length of the feed-in end, for bridging gaps in the duct sidewall 14.

This partial filling with the filling body 22 also makes possible the blowing of the bundle of guide tubes and allows easy access to each guide tube for branching. The protective duct 14 can be installed in other channelization ducts or may also be laid direct buried into the ground.

According to an exemplary embodiment of the invention, the guide tubes 12 to be installed and/or the filling body 22 are pressurized and sealed on both ends to avoid collapsing the guide tubes as the protective duct 14 is pressurized. The fluid flowing along the external walls of the sealed guide tubes to be installed, for open as well as semi-permeable shuttles, has a higher velocity than the traveling speed of the guide tubes, so that a propelling drag force is exerted on the external walls. The method according to the pressurized embodiment can be carried out with or without a shuttle.

According to conventional practice, first it is tried to install as many guide tubes as possible, simply because even more cables can be installed later and because of the low costs of the guide tubes (a small number is in most cases easier to install, although an extremely small number might cause buckling because of the excessive free space) Exceeding 70% filling degree can cause problems because of above-mentioned reasons and because of the tendency of guide-tubes to "lock themselves" and cause tangles when the filling degree is too high.

According to the preferred installation method of the present invention the maximum installation length is almost always achieved and the advantage exists that the existing protective duct need not be provided with openings at pre-calculated points during installation or afterwards, which is highly cost-effective. In order to avoid the counter-pressure arising at the feed-in end of the existing protective duct when introducing the bundle of guide tubes to be installed, it is preferred that adjacent this feed-in end, means are arranged, for instance the motor-driven pressure rollers 38, which are adapted, through engagement about the circumference of the bundle of tubes to be installed, to lead the guide tubes and filling body into the existing protective duct 14, thereby providing supplemental pushing during installation.

The function of the protective duct 14 is to guide and protect the guide tubes 12 and their optical cables. In order to allow installation of a loose bundle 34 of guide tubes by blowing, the protective duct should resist the required pressure differences. The protective ducts may be direct buried into the ground and are of commonly used type, e.g. HDPE ducts. They should be circular and uniform in cross-section throughout their length. Their outer and inner surfaces should be free from irregularities such as cracks, pinholes, joints, water splash marks, die-marks, repairs and all other defects.

The preferred outer diameters of the protective ducts 14 are 25, 32, 40, 50 and 63 mm (metric), or US equivalents. The preferred outer diameters of the guide tubes are 7 and 10 mm, respectively. The preferred dimensions for the filling body are 14 to 40 mm. In the preferred embodiment, the filling body 22 is constructed by extrusion of e.g. HDPE, nylon or ABS. The airflow passage 10A of the filling body 10 (FIG. 3) has a diameter of 12 mm and the tubular sidewall has a sidewall thickness of 2 mm or less. For the filling body embodiment of FIG. 4 the sizes are the same as for FIG. 3, only now with filling up the rib between the guide tubes. The outer diameter (over the ribs) of the filling bodies of FIG. 7 and FIG. 8 are 23 mm and 19 mm, respectively. The thickness of the ribs and the inner sidewalls are 0.5 mm and 1 mm for FIG. 7 and FIG. 8, respectively.

Figure 9:
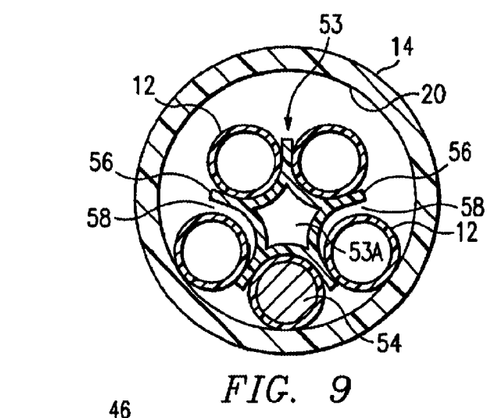
FIG. 9 is a view similar to FIG. 8 with four guide tubes and a filling body installed in a protective duct in which a resident cable has already been laid.
Figure 10:
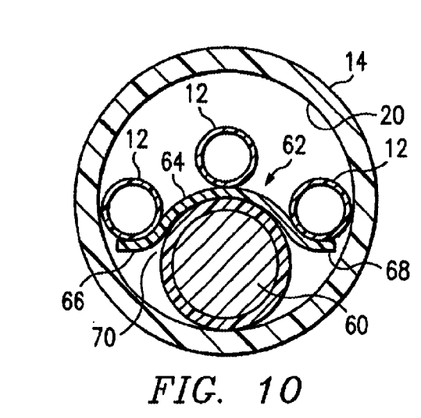
FIG. 10 is a view similar to FIG. 9 in which three guide tubes and a filling body according to an alternative embodiment are installed in a protective duct in which a resident cable or a tight bundle of relatively large diameter has already been laid.
Figure 12:
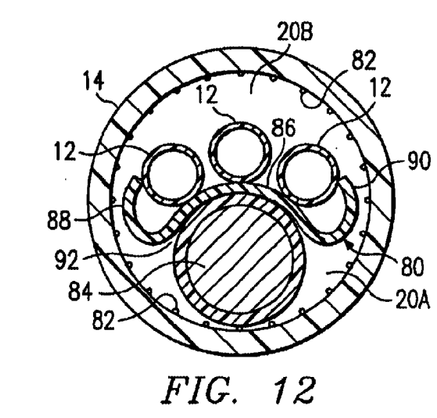
FIG. 12 is a view similar to FIG. 10 in which three guide tubes and filling bodies according to an alternative embodiment are installed in a protective duct in which a resident cable or a tight bundle of relatively large diameter has already been laid.

The airflow passage 22A in FIG. 7 has a diameter of 7 mm. For FIG. 8 the airflow passage 30A is about 9 mm (but the shape is pentagonal). In FIG. 9 the sizes are the same as in FIG. 8. The diameter of 10 mm of the resident tube or cable element 54 is the same as for the guide tubes 12. In FIGS. 10 and 12 the resident tube or cable element 60 has a diameter of 16.3 mm and 20 mm, respectively, and the profile has a width of 28 mm and 34 mm, respectively, and a wall thickness of 1 mm. The guide tube outer diameters are 7 mm in FIGS. 2, 3 and 4 and 10 mm in FIGS. 7, 8, 9, 10 and 12. The protective duct outer diameters are 40 mm in FIGS. 2, 3, 4, 7, 8, 9 and 10 and 50 mm in FIG. 12.

The function of the guide tubes 12 is to form dedicated channels to guide optical cables through the access network without splicing the cables. In order to allow installation of both the optical cables and the bundle of guide tubes by blowing, the guide tubes and filling body should resist the needed pressure, both internal and external (to avoid implosion the guide tubes and filling body are also pressurized during installation of the bundle). The guide tubes preferably are formed of high-density polyethylene (HDPE). Other material, e.g. nylon or ABS, is also possible. The guide tubes 12 are preferably circular and uniform in cross-section throughout their length. Their outer and inner surfaces should be free from irregularities such as cracks, pinholes, joints, water splash marks, die-marks, repairs and all other defects.

The outside of the guide tubes 12 should be free from lubricant or other contamination. The diameters of the guide tubes used in the loose bundle installation are 7/5.5 and 10/8 mm.

For pushing and blowing of the bundle of guide tubes the blowing compressor unit 26 is used in combination with specially designed caterpillar belts or driven rollers 38 in which the bundle of guide tubes is accurately stacked and clamped. Optionally, the guide tubes 12 and filling body 22 may also be guided through one or more molds 52, in which the guide tubes and filling body are held in the desired array positioning as shown in FIG. 5 and FIG. 7. The separate reels 48 and 50 are placed on a specially designed frame and are driven by multiple unwind-units (passive or active, i.e. mechanically driven). Before blowing the bundle of guide tubes, the protective duct 14 may be lubricated with a special lubricating material.

The guide tubes 12 and a filling body 22 are first pressurized preferably at a pressure at least equal to the pressure used to blow in the bundle. This precaution is to avoid implosion collapse of the guide tubes. The guide tubes are pressurized through air check valves attached on the trailing end portions of the guide tubes and filling body. To avoid ingress of lubrication, the bundle of guide tubes is forwarded inside the protective duct 14 only after the guide tubes are fully pressurized (a few minutes after coupling of the compressor 26). The pressurization is checked with a manometer at the reel end of each guide tube. After installation the guide tubes are closed off using watertight seals.

A filling body 53 according to an alternative profile arrangement is shown in FIG. 9. This filling body includes five spacing ribs 56 that project radially in a "PentaStar" profile. The filling body 53 is intersected by a longitudinal airflow passage 53A that is bounded by five convex sidewall segments that are joined together at the apex of each rib. The PentaStar profile filling body 53 can be used for installing five guide tubes 12 as previously discussed in connection with the filling body 22 shown in FIG. 7. Moreover, the pentagonal profile embodiment 53 can be used to install four guide tubes in a protective duct 14 in which a resident guide tube or cable 54 has already been laid. Adjacent ribs 56 together with the concave sidewall portions define longitudinal pockets 58 in which the guide tubes 12 are constrained. During installation, four guide tubes 12 are positioned in the pockets, leaving one empty pocket in which the resident guide tube or cable 54 is positioned. The filling body 53 is guided along the resident cable 54 as the bundle is advanced through the duct 14. Installation of the bundle of filling body and guide tubes is performed via a Y-branch connector where the resident cable is guided through the branch and clamped and sealed off there.

Yet another filling body profile 62 is shown in FIG. 10 for installation in a protective duct 14 when a resident cable or guide tube 60 containing one or more cables has already been laid. In this arrangement, three guide tubes 12 are installed in a protective duct 14 in which a large diameter cable or guide tube 60 has already been laid. In this embodiment, an open intermediate half-moon sidewall portion 64 that is terminated on opposite sides by longitudinally extending flange portions 66, 68, forms the filling body 62. The resident guide tube/cable assembly 60 is received in a longitudinal pocket 70 formed by the concave sidewall of the intermediate half-moon sidewall portion. The filling body 62 partitions or divides the air flow space 20 of the protective duct 14 into two channels, one containing only the previously installed guide tube/cable assembly 60, and the other containing the three guide tubes 12. The guide tubes are prevented from crossing over from one channel into the other by the curved sidewall portions of the open filling body 62.

The partial filling of guide tubes arranged in a loose bundle, when the pressure is taken away from a deformable (collapsible) filling body, also provides good mechanical protection. By limiting the bundle so that the guide tubes only partially fill the duct air flow space, preferably by a filling factor of about 50% (half of duct cross-sectional area) and not more than about 70%, the guide tubes and hence any cables contained therein are protected just as good as armored cables, because the loose guide tubes can move away when the duct is indented. Also, by installing the guide tubes and filling body as a loose bundle as opposed to a solid (tightly bound) bundle, the guide tubes are more easily accessible at branch points that are formed as new subscribers are added.

After collapsing, the hollow filling body is substantially reduced in thickness and the filling factor is obtained by taking the total of guide tubes and, if present, any resident cables. A good collapsible filling body becomes so small after collapsing that the same number of guide tubes can be present as without the filling body. Of course the filling body increases the total cross-sectional area during installation when it is pressurized, but it does not perform the protection function at that time. The function of the pressurized filling body is to improve installation of the bundle. The larger the total cross-sectional area, the less likely crossing of guide tubes will occur.

Figure 11:
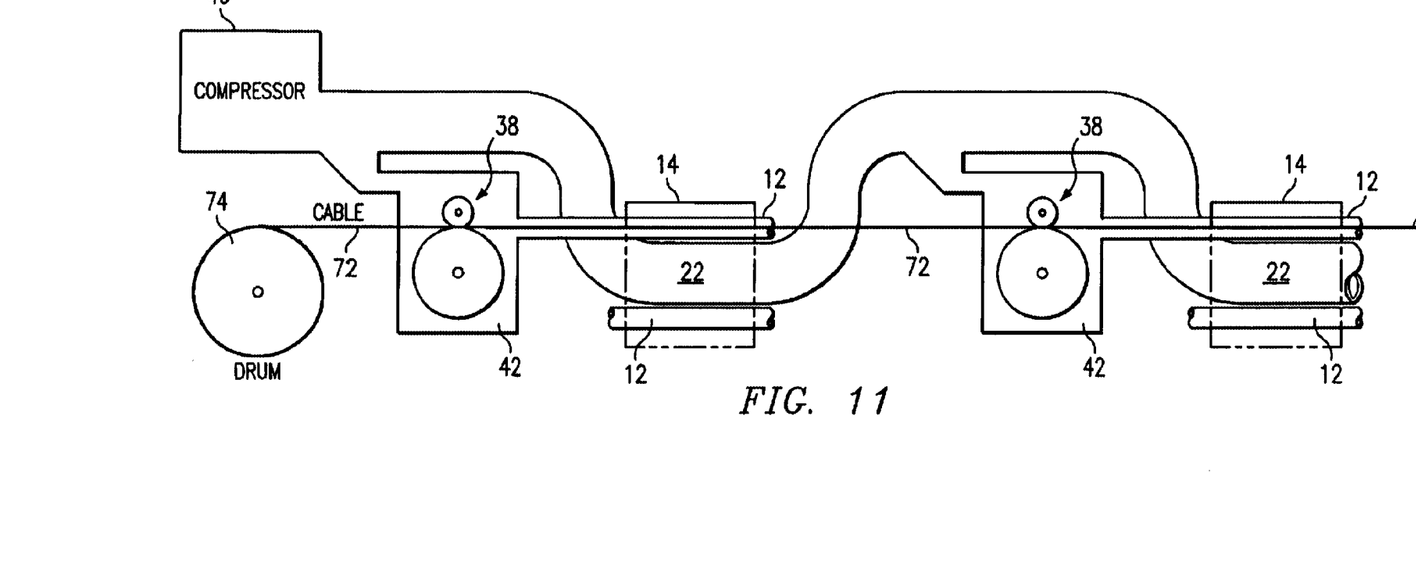
FIG. 11 is a simplified schematic diagram showing pushing/blowing installation of cable in a tandem operation with pressurized air being fed through the airflow passage of a filling body that has been previously installed with guide tubes in a protective underground duct.

Referring now to FIG. 11, the filling body 22 can also be used to feed pulling machines in a tandem installation. This method makes it possible to blow in a cable 72 as it is supplied from a previously laid section of protective duct in a tandem installation, or as it is unwound from a drum 74. This makes it possible to install the cable by blowing and pushing with blowing/pushing machines connected in a tandem operation, using only a single compressor 46. This is possible when the inner diameter of the filling body 22 is greater than the inner diameter of the guide tubes 12, and hence the pressure drop over the filling body is negligible.

The filling body 22 can also be used for installing a bundle 34 of guide tubes in an existing protective duct 14 in which one or more guide tube or cable elements are already installed. This can be done, for example with a filling body 22 (shown in FIG. 7). Referring to FIG. 9, consider that a cable or guide tube containing one or more cables is the element 54 that is already present. The bundle 34 can then slide over the element 54, without the risk of extra friction due to wedging of guide tubes 12 between the cable and the duct sidewall, without the risk of crossing tubes and also without the harmful effect of the guide tubes forming S-shaped profiles (as in FIGS. 1 and 2) between the cable and the duct sidewall and experiencing friction loading. The same is in principle also possible for other dimensions of cables or more cables present. The profile of the filling body 22 can be adjusted to accommodate the size and number of cables that are already present when additional guide tubes and/or cables are to be installed.

For some installations, the existing protective duct 14 will be subject to large temperature fluctuations, for example at bridge crossings. Thermal contraction effects of the guide tubes and the protective duct may lead to buckling of the guide tubes, which will hinder installation of cables 72 that are laid at a later time. The buckling effect is especially risky where there is a mismatch between the duct and the minitubes. This may occur where there are quick temperature variations in which temperatures of the duct and the minitubes are out of phase. Additionally, different thermal contraction coefficients of the duct and minitubes may cause buckling, especially where the existing protective duct is mechanically fixed. Such buckling can be present at temperature changes of 15°–50° Celsius. When a filling body is used, the allowable temperature changes increase by an order of magnitude.

After installation of a bundle of guide tubes with the filling body, it is possible to blow/pull the filling body out of the duct, while at the same time holding the bundle of guide tubes. This can also be done in tandem, using the filling body immediately for the next section where a bundle of guide tubes is to be installed. This has the advantage that coiling of the filling body on a drum is not required, since the filling body is simply pulled from the preceding tandem duct section.

Yet another filling body profile 80 is shown in FIG. 12 for installation in a protective duct 14 of 50 mm diameter where a resident cable or guide tube of relatively large diameter (containing one or more cables) has already been laid. In this embodiment, three guide tubes 12 of 10 mm diameter are installed in the protective duct 14, which has longitudinal ribs 82 on the inner sidewall, in which a large diameter cable 84 (or large diameter guide tube containing one or more cables) has already been laid. Preferably, the open filling body 80 is formed by a curved sidewall partition 86 that has a gull-wing profile in cross-section and is terminated on opposite sides by longitudinally extending, rounded flange portions 88, 90. The resident guide tube/cable assembly 84 is received in a longitudinal pocket 92 formed by the concave side of the curved partition 86.

The filling body 80 partitions or divides the air flow space 20 of the protective duct 14 into two channels 20A,20B. One channel 20A contains only the resident guide tube/cable assembly 84, and the other channel 20B contains only the three guide tubes 12. The guide tubes are prevented from crossing over from one channel into the other by the rounded flange portions 88,90 of the open filling body 80. The rounded flange portions 88,90 are shaped such that they cannot stick behind the ribs 82 on the inner sidewall of the protective duct 14 and are hence not forced to follow the longitudinal extension of the ribs 82. This is especially important when the ribs 82 follow a helical or (SZ) stranded path. With the rounded flange portions, the filling body and the guide tubes can be installed in a straight line, without being forced to follow the helix which would be the case when the curved flange portions stick behind the ribs.

Although certain preferred embodiments illustrate the filling body constructed in the form of a tubular sidewall, the filling body may optionally be constructed as a solid body, for example as shown in the embodiments of FIGS. 10 AND 12. In this embodiment, the solid filling body is solid throughout and does not have an internal passage. Optionally the solid filling body may have ribs integrally formed with a solid central spacer body (rounded profile or otherwise), or could simply be for example a solid spacer body without ribs, and capable of being squeezed substantially flat in response to compression forces. Preferred materials for the solid filling body embodiments include, for example, extrusions of foamed plastic polyethylene or PUR. In the case the whole filling body is made of collapsible foamed material, it is recommended not to use the same blowing unit (caterpillar) for installation, but to use a separate blowing unit with a Y-branch connector for insertion into the protective duct, so that a stable stack of guide tubes is maintained in the other blowing unit (caterpillar).

The filling bodies of the present invention can be made to be collapsible and may include an internal passage that can be pressurized, for example as shown in FIGS. 3,4,7,8 and 9. In that case the filling body material should be soft and pliable, and preferably reinforced with roving to maintain tensile and torsion stability. The sidewall of the internal passage may be thinner but should be durable and able to withstand internal pressurization without bulging or expanding since the size and shape of the filling body are carefully selected to yield the desired duct filling factor. Expansion of the filling body beyond its nominal unpressurized dimensions should be avoided since such expansion could lead to over-sizing of the bundle and hindering or blocking advance of the bundle through the protective duct space.

The flexible, thin-walled embodiments with tensile and torsion reinforcement by roving will easily collapse by implosion when a bundle is installed in a pressurized duct; for that reason the filling body should also be pressurized during installation. After installation has been completed, pressure is taken away from the filling body thus permitting the soft material of the filling body to collapse when excessive forces are applied to the bundle, which might happen for example when the protective duct is hit or otherwise damaged by excavation forces. Mechanical protection of the protective guide tubes is guaranteed during post-installation service by removing the internal pressure, thus allowing the filling body to collapse and permitting the guide tubes to move away and avoid pinching or crushing forces that might damage or interfere with fiber optic cables installed therein.

What is claimed is:

1. A method for installing a bundle of guide tubes in a protective duct, comprising the steps:
   supplying a plurality of guide tubes;
   supplying an elongated filling body having portions engagable with the guide tubes for opposing crossing over of the guide tubes within the protective duct;
   arranging the guide tubes and the filling body together in side-by-side loose bundle relation;
   feeding the loose bundle of guide tubes and elongated filling body into the protective duct; and
   introducing a fluid under pressure into the protective duct.

2. The method according to claim 1, including the step of selecting the number of guide tubes and cross sectional areas of the guide tubes and filling body such that crossing of the guide tubes within the protective duct is made impossible.

3. The method according to claim 1, including the step of selecting the number of guide tubes and the cross sectional areas of the guide tubes to provide a partial filling of the protective duct in the range of from about 30% to about 70%.

4. The method according to claim 1, including the step of selecting the number of guide tubes and the cross sectional areas of the guide tubes to provide partial duct filling of about 50%.

5. The method according to claim 1, including the step of selecting the number of guide tubes and the cross sectional areas of the guide tubes to provide a partial duct filling of less than 50%, but not less than about 30%.

6. The method according to claim 1, including the step of selecting the number of guide tubes and the cross sectional areas of the guide tubes to provide a partial duct filling of more than 50%, but not more than about 70%.

7. The method according to claim 1, including the step:
   pressurizing the guide tubes and sealing the pressurized guide tubes at the leading end and at the trailing end thereof.

8. The method according to claim 1, including the step:
   pressurizing the filling body and sealing the pressurized filling body at the leading end and at the trailing end thereof.

9. The method according to claim 8, including the step of releasing the pressure from the filling body after the installation has completed.

10. The method according to claim 1, including the step of constructing the filling body of a collapsible material.

11. The method according to claim 10, including the step of reinforcing the collapsible material with cross-stranded roving.

12. The method according to claim 1, including the step of maintaining the guide tubes and filling body in loose association with each other as they are fed into the protective duct.

13. The method according to claim 1, including the step of positioning the guide tubes and the filling body in a symmetrical loose bundle as they are fed into the protective duct.

14. The method according to claim 13, wherein the positioning step is performed by guiding the loose bundle of guide tubes and the filling body through a symmetrical mold as they are being fed into the protective duct.

15. The method according to claim 1, including the step:
engaging the loose bundle with drive wheels on at least three sides.

16. The method according to claim 1, including the step:
engaging the guide tubes with a set of caterpillar belts enclosing the bundle.

17. The method according to claim 1, including the steps:
supplying each guide tube to be installed from a reel; and
unwinding the reel as the guide tube is fed into the protective duct.

18. The method according to claim 1, including the steps:
supplying the filling body to be installed from a reel; and
unwinding the reel as the filling body is fed into the protective duct.

19. The method according to claim 1, including the steps:
supplying the filling body to be installed from an existing protective duct where the filling body has been previously laid.

20. The method according to claim 1, including the step:
engaging a circumference of the guide tubes to be installed adjacent to the inlet end of the protective duct with a set of powered drive rollers so that the tubes and filling body are positioned in a symmetrical pattern as they are fed into the protective duct.

21. The method according to claim 1, including the step:
laying one or more cables in one or more of the guide tubes before installing the guide tubes in the protective duct.

22. The method according to claim 1, in which one or more previously installed cables and/or guide tubes are already present in the protective duct.

23. The method according to claim 22, including the step:
selecting the number of guide tubes to be installed to provide a duct filling degree in the range between 30% and 70%, in which the cross-sectional areas of the previously installed cables and/or guide tubes are added.

24. The method according to claim 1, including the step:
installing one or more cables, by blowing and/or pushing, in one or more of the guide tubes after installing the tubes in the protective duct.

25. The method according to claim 1, in which one or more previously installed cables and/or guide tubes are already present in the protective duct, including the step:
engaging the filling body against the one or more of the previously installed cables and/or guide tubes as the bundle is installed in the protective duct.

26. The method according to claim 1, including the step:
pressurizing the filling body thereby maintaining its size and shape during installation; and
releasing the pressure in the filling body and allowing the bundle diameter to contract by collapsing of the filling body after installation.

27. A method for installing a bundle of guide tubes in a protective duct, comprising the steps:
supplying a number of guide tubes;
supplying an elongated filling body having portions forming pockets extending longitudinally along the filling body;
positioning the guide tubes in the pockets and in side-by-side loose bundle relation with the filling body;
feeding the loose bundle of guide tubes and filling body into the protective duct; and
introducing a fluid under pressure into the protective duct.

28. A method for installing a bundle of guide tubes in a protective duct, comprising the steps:
supplying a number of guide tubes;
supplying an elongated filling body having ribs extending longitudinally along the filling body and circumferentially separated from each other;
positioning one or more of the guide tubes between circumferentially separated ribs and in side-by-side loose bundle relation with the filling body;
feeding the loose bundle of guide tubes and elongated filling body into the protective duct; and
introducing a fluid under pressure into the protective duct.

29. A method for installing a bundle of guide tubes in a protective duct, comprising the steps:
supplying a number of guide tubes;
supplying an elongated filling body having flange portions projecting from the filling body and circumferentially separated from each other;
positioning one or more of the guide tubes between circumferentially separated flange portions and in side-by-side loose bundle relation with the filling body;
feeding the loose bundle of guide tubes and elongated filling body into the protective duct; and
introducing a fluid under pressure into the protective duct.

* * * * *